US012736482B2

(12) United States Patent
Nagase et al.

(10) Patent No.: US 12,736,482 B2
(45) Date of Patent: Sep. 15, 2026

(54) SYSTEM, METHOD AND DEVICE FOR CHECKING BLADES OF WIND POWER PLANT

(71) Applicant: NTT, Inc., Tokyo (JP)

(72) Inventors: Fumiaki Nagase, Musashino (JP); Yu Ono, Musashino (JP); Tatsuya Nakatani, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 98 days.

(21) Appl. No.: 18/875,184

(22) PCT Filed: Jul. 4, 2022

(86) PCT No.: PCT/JP2022/026600
§ 371 (c)(1),
(2) Date: Dec. 16, 2024

(87) PCT Pub. No.: WO2024/009356
PCT Pub. Date: Jan. 11, 2024

(65) Prior Publication Data

US 2025/0369901 A1 Dec. 4, 2025

(51) Int. Cl.
*G01N 22/02* (2006.01)
*F03D 17/00* (2016.01)

(52) U.S. Cl.
CPC ........... *G01N 22/02* (2013.01); *F03D 17/028* (2023.08); *F05B 2260/83* (2013.01)

(58) Field of Classification Search
None
See application file for complete search history.

(56) References Cited

U.S. PATENT DOCUMENTS

2005/0264275 A1 12/2005 Bosselmann et al.
2012/0136630 A1* 5/2012 Murphy .................. F03D 17/00 702/188
2015/0159632 A1* 6/2015 Vangen ..................... F03D 7/04 416/61

FOREIGN PATENT DOCUMENTS

JP 2019-027908 A 2/2019
JP 2020-118141 A 8/2020
JP 6768983 B1 10/2020
JP 7022858 B1 2/2022

* cited by examiner

*Primary Examiner* — Jas A Sanghera
(74) *Attorney, Agent, or Firm* — XSENSUS LLP

(57) ABSTRACT

A blade inspection system includes: a transmitter of electromagnetic waves mounted in a first unmanned aerial vehicle (UAV); a receiver of electromagnetic waves mounted in a second UAV; at least one processor communicably coupled to the transmitter and the receiver; and a memory storing instructions executable by the at least one processor. The instructions causes the at least one processor to execute: emitting electromagnetic waves from the transmitter to the rotating surfaces of the blades of a wind power plant in a state where the first UAV and the second UAV face each other with the blades sandwiched therebetween; receiving, by the receiver, at least one of a reflected wave and a diffracted wave generated by the blades due to the emission of the electromagnetic waves from the transmitter; and determining whether there is an abnormality in the blades through analysis of the reflected wave or the diffracted wave.

7 Claims, 14 Drawing Sheets

Fig. 1

100A
100B
120A
120B
104A
104B
8
4
6
6
6
REFLECTED WAVES
DIRECT WAVES
DIFFRACTED WAVES 10A
20A
10B
20B
202
200
290
292
294
PROCESSOR
MEMORY
INSTRUCTIONS
102A
110A
120A
104A
100A
PROCESSOR
MEMORY
INSTRUCTIONS
190A
192A
194A
102B
110B
120B
104B
100B
PROCESSOR
MEMORY
INSTRUCTIONS
190B
192B
194B
2

Fig. 6

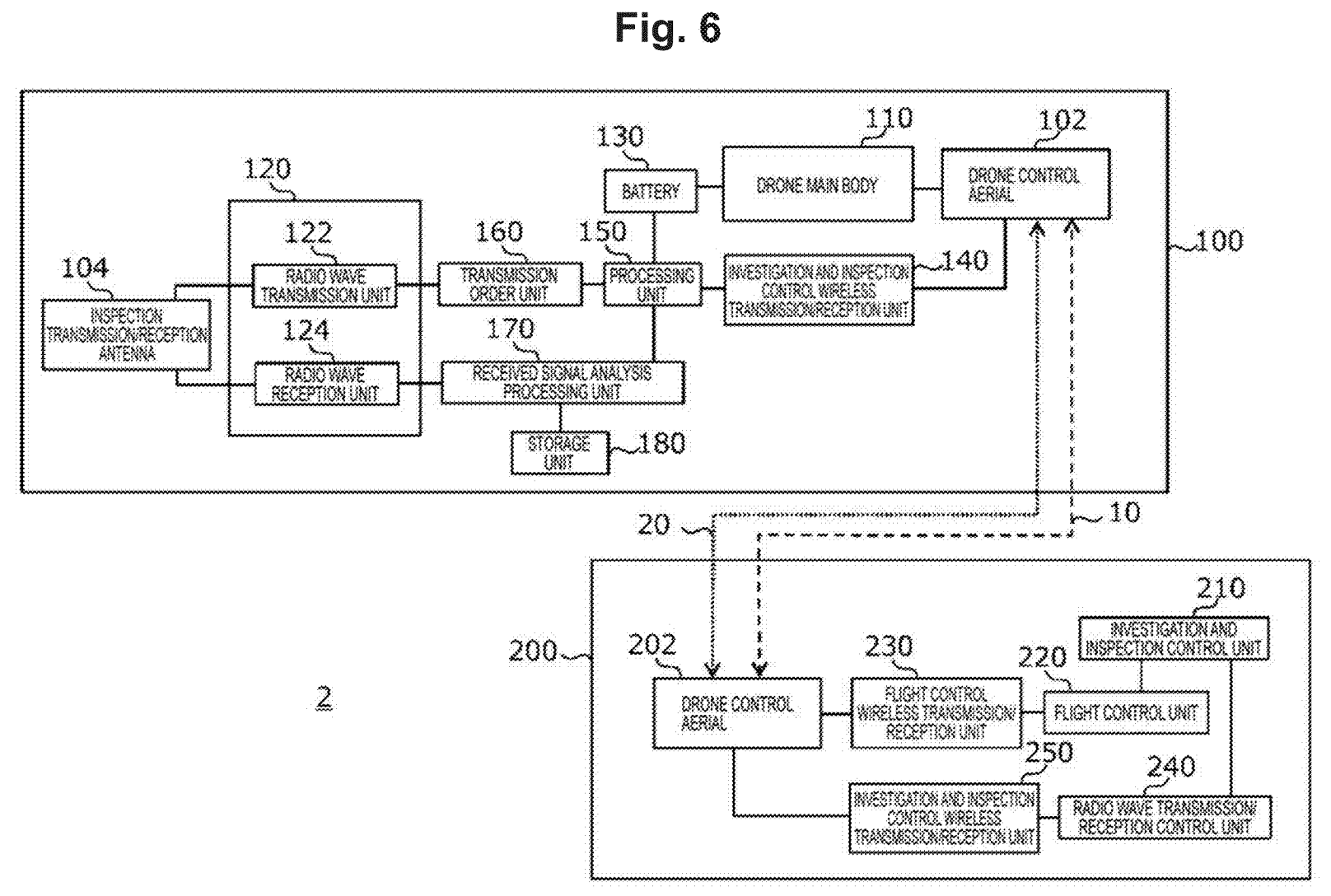

100
102 DRONE CONTROL AERIAL
110 DRONE MAIN BODY
140 INVESTIGATION AND INSPECTION CONTROL WIRELESS TRANSMISSION/RECEPTION UNIT
130 BATTERY
150 PROCESSING UNIT
160 TRANSMISSION ORDER UNIT
170 RECEIVED SIGNAL ANALYSIS PROCESSING UNIT
180 STORAGE UNIT
120
122 RADIO WAVE TRANSMISSION UNIT
124 RADIO WAVE RECEPTION UNIT
104 INSPECTION TRANSMISSION/RECEPTION ANTENNA
10
20
200
202 DRONE CONTROL AERIAL
210 INVESTIGATION AND INSPECTION CONTROL UNIT
220 FLIGHT CONTROL UNIT
230 FLIGHT CONTROL WIRELESS TRANSMISSION RECEPTION UNIT
240 RADIO WAVE TRANSMISSION RECEPTION CONTROL UNIT
250 INVESTIGATION AND INSPECTION CONTROL WIRELESS TRANSMISSION/RECEPTION UNIT
2

2-1
300
310
RECEIVED SIGNAL ANALYSIS PROCESSING UNIT
302
PROCESSOR
304
MEMORY
306
INSTRUCTIONS
102A
120A
104A
100A
200
202
4
6
RECEIVED DATA
102B
120B
104B
100B 2-2
300
302
304
306
310
RECEIVED SIGNAL ANALYSIS PROCESSING UNIT
PROCESSOR
MEMORY
INSTRUCTIONS
200
100A
100B
190B
192B
194B
196B
PROCESSOR
MEMORY
INSTRUCTIONS
STORAGE

SYSTEM, METHOD AND DEVICE FOR CHECKING BLADES OF WIND POWER PLANT

CROSS-REFERENCE TO RELATED APPLICATION

The present application is based on PCT filing PCT/JP2022/026600, filed Jul. 4, 2022, the contents of which are incorporated herein by reference in their entirety.

TECHNICAL FIELD

The present disclosure relates to a system, a method, and a device for checking blades of a wind power plant.

BACKGROUND ART

For infrastructure facilities, regular or irregular inspections are required. As an example of such an infrastructure facility, a wind power plant is known. In the case of a wind power plant, inspection for checking whether there are scratches or degradation in rotating blades is required.

As documents that disclose methods for checking blades of a wind power plant, it is possible to exemplify Japanese Patent No. 6768983 and Japanese Patent No. 7022858. Japanese Patent No. 6768983 introduces a method of a worker checking blade surfaces with a camera for monitoring outside through an inspection opening in a tower outer wall or with a camera mounted in a drone as a conventional method. Japanese Patent No. 7022858 discloses a proposal regarding a photographing method in a case where blade surfaces are photographed with a camera mounted in a drone.

However, the inspection with the camera is easily affected by weather. For example, there may be a case where scratches, cracking, or defects are not captured by the camera when the blades are back lit, in cloudy weather, or at nighttime even if there are any scratches on the blades. Also, there may be a case where it is not possible to determine folding and bending in the blades in image diagnosis for an image captured by the camera.

Since power generation is interrupted when rotation of the blades is stopped, it is desirable that the inspection be performed during the rotation of the blades. Therefore, in order to photograph scratches on the blades with the camera, it is necessary to adjust the shutter speed in accordance with the rotation speed of the blades. However, since it is necessary to increase the shutter speed when the rotation speed of the blades is high, there may be a case where scratches on the blades are not accurately captured if resolution or brightness as camera lens performance is low.

PRIOR ART DOCUMENT

Patent Literature

[Patent Literature 1] Japanese Patent No. 6768983
[Patent Literature 2] Japanese Patent No. 7022858

SUMMARY OF INVENTION

Problems to be Solved by the Invention

The present disclosure has been made in view of the above problems. An object of the present disclosure is to enable inspection of blades of a wind power plant without being affected by a rotation speed of the blades or weather.

Solution to Problem

The present disclosure provides a system for checking blades of a wind power plant in order to achieve the above object. The system according to the present disclosure includes: a transmitter of electromagnetic waves that is mounted in a first unmanned aerial vehicle; and a receiver of electromagnetic waves that is mounted in a second unmanned aerial vehicle. The system according to the present disclosure further includes: at least one processor that is communicatively coupled to the transmitter and the receiver; and a memory that is communicatively coupled to the at least one processor and stores a plurality of executable instructions. The plurality of instructions are configured to cause the at least one processor to execute the following processing. The first processing is emitting electromagnetic waves from the transmitter toward rotating surfaces of the blades in a state where the first unmanned aerial vehicle and the second unmanned aerial vehicle face each other with the rotating surfaces of the blades sandwiched therebetween or by using the rotating surfaces as reflecting surfaces. The second processing is receiving, by the receiver, at least one of a reflected wave and a diffracted wave generated by the blades due to the emission of the electromagnetic waves from the transmitter. Also, the third processing is determining whether or not there is an abnormality in the blades through analysis processing of the reflected wave or the diffracted wave received by the receiver.

Also, the present disclosure provides a method for checking blades of a wind power plant in order to achieve the above object. The method according to the present disclosure includes the following steps. The first step is emitting electromagnetic waves from a transmitter toward rotating surfaces of the blades in a state where a first unmanned aerial vehicle and a second unmanned aerial vehicle face each other with the rotating surfaces of the blades sandwiched therebetween or by using the rotating surfaces as reflecting surfaces. The second step is receiving, by a receiver, at least one of a reflected wave and a diffracted wave generated by the blades due to the emission of the electromagnetic waves from the transmitter. Also, the third step is determining whether or not there is an abnormality in the blades through analysis processing of the reflected wave or the diffracted wave received by the receiver.

Furthermore, the present disclosure provides a device for checking blades of a wind power plant in order to achieve the above object. The device according to the present disclosure includes: an antenna; a receiving unit; and an analysis processing unit. The receiving unit is configured to receive, by using the antenna, at least one of a reflected wave and a diffracted wave generated by the blades due to emission of electromagnetic waves from a transmitter of electromagnetic waves in a case where the antenna faces the transmitter with rotating surfaces of the blades sandwiched therebetween or in a case where the rotating surfaces are used as reflecting surfaces. The analysis processing unit is configured to determine whether or not there is an abnormality in the blades through analysis processing of the reflected wave or the diffracted wave received by the receiving unit. Note that the analysis processing unit included in the device according to the present disclosure may be implemented by a computer and a program. The program may be recorded in a computer-readable recording medium or may be provided via a network.

Advantageous Effects of Invention

According to the system, method, and device of the present disclosure, the reflected wave or the diffracted wave generated by the blades due to the emission of the electromagnetic waves from the transmitter is subjected to the analysis processing, and whether or not there is an abnormality in the blades is determined on the basis of a result of the analysis processing. It is thus possible to perform inspection of blades of a wind power plant without being affected by a rotation speed of the blades and weathers.

BRIEF DESCRIPTION OF DRAWINGS

FIG. 1 is a diagram for explaining an outline of a method of checking blades of a wind power plant according to an embodiment of the present disclosure.

FIG. 6 is a block diagram illustrating a configuration of the inspection system for blades of a wind power plant according to the embodiment of the present disclosure.

DESCRIPTION OF EMBODIMENTS

1. Outline of Blade Inspection Method

Figure 2:
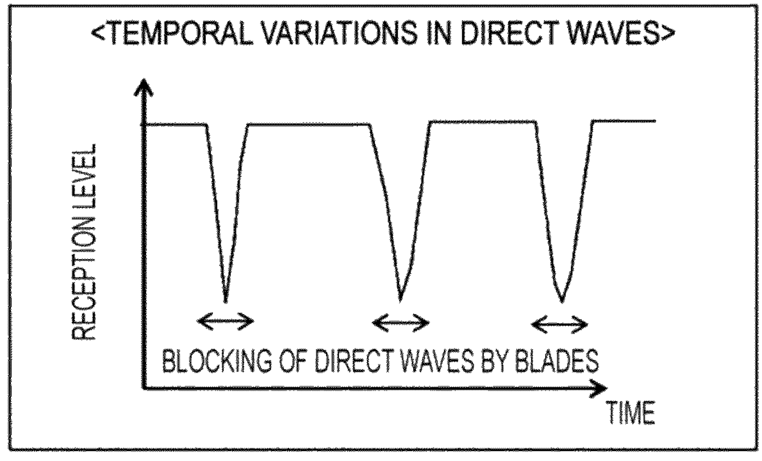
FIG. 2 is a diagram illustrating an example of temporal variations in a direct wave that is received by a radio wave receiver in a case where the radio wave is emitted from a radio wave transmitter to rotating surfaces of the blades.

Hereinafter, a system for checking blades of a wind power plant and a method executed by the system according to an embodiment of the present disclosure will be described with reference to the drawings. Hereinafter, the system for checking blades of a wind power plant will be referred to as a blade inspection system, and the method executed by the blade inspection system will be referred to as a blade inspection method.

Figure 1:
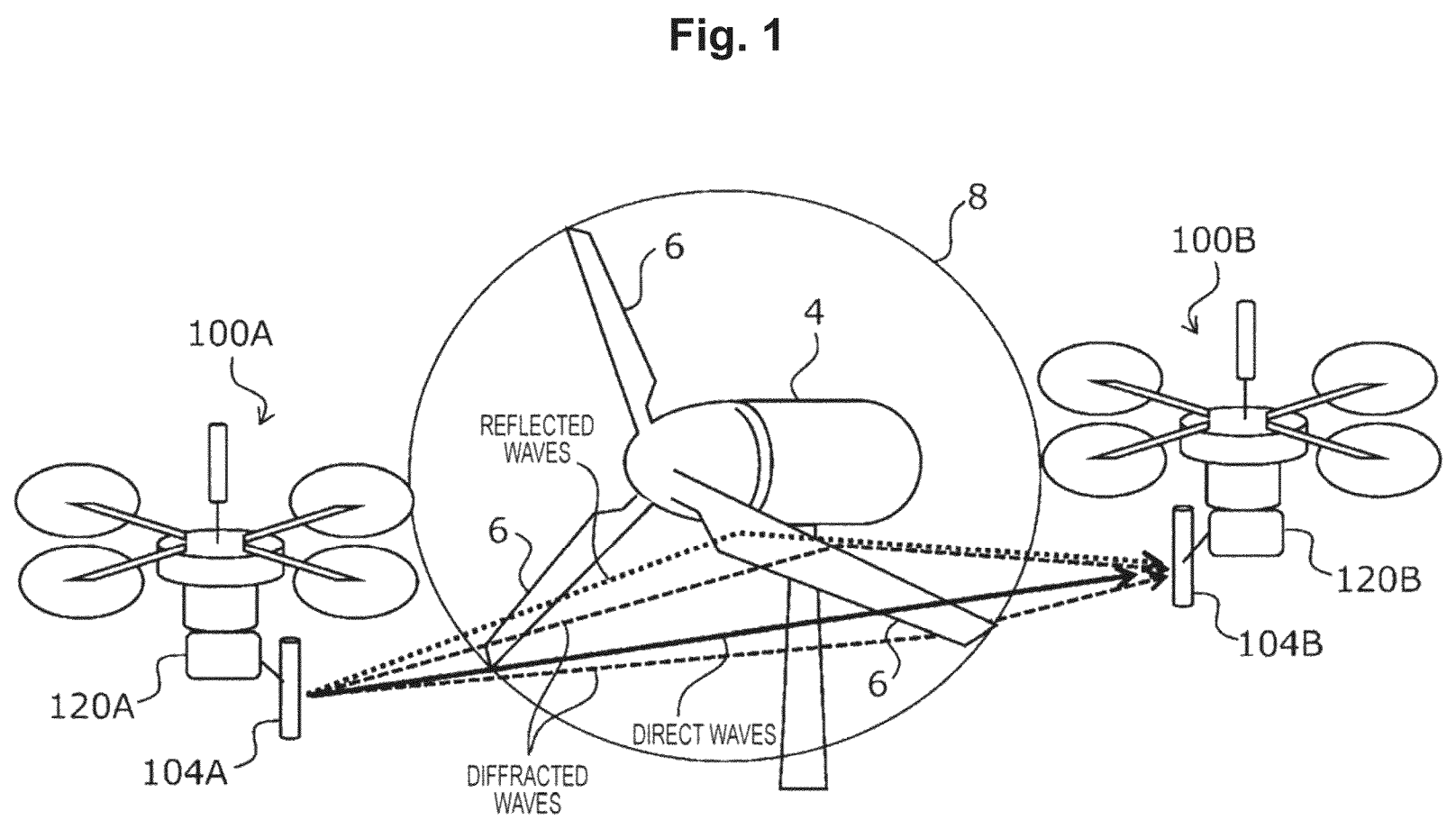

First, an outline of the blade inspection method according to the embodiment of the present disclosure will be described by using FIG. 1. The blade inspection method according to the present embodiment is performed during an operation of a wind power plant 4, that is, when blades 6 of the wind power plant 4 are rotating. In the blade inspection method according to the present embodiment, unmanned aerial vehicles are used. Specifically, the unmanned aerial vehicles used are two drones 100A and 100B that can hover in the air. Hereinafter, the drone 100A will be referred to as a first drone while the drone 100B will be referred to as a second drone in a case where both are to be distinguished.

The first drone 100A includes a radio wave transmitter 120A. The second drone 100B includes a radio wave receiver 120B. At the time of inspection of the blades 6, the two drones 100A and 100B are caused to fly near the wind power plant 4 and are disposed at positions where the drones 100A and 100B face each other with the blade rotating surfaces 8 of rotating blades 6 sandwiched therebetween. Then, radio waves for inspection are emitted from a transmission antenna 104A for inspection of the radio wave transmitter 120A mounted on the first drone 100A toward the blade rotating surfaces 8. The radio waves emitted from the radio wave transmitter 120A pass through the blade rotating surfaces 8 and reach a reception antenna 104B for inspection of the radio wave receiver 120B mounted in the second drone 100B.

In a case where there is no interruption between the first drone 100A and the second drone 100B, the radio waves emitted from the transmission antenna 104A for inspection reach the reception antenna 104B for inspection as direct waves. However, the blades 6 rotate between the first drone 100A and the second drone 100B during an operation of the wind power plant 4. Therefore, some of the emitted radio waves are blocked by the blades 6 at a timing when the blades 6 block the direct waves. When the radio waves emitted from the radio wave transmitter 120A are blocked by the blades 6, diffracted waves going around to the rear side of the blades 6 occurs, and they are received along with the direct waves by the radio wave receiver 120B. In regard to the diffracted waves, the diffracted waves that are diffracted at edges of the blades 6 on the front side in the rotation direction and the diffracted waves that are diffracted at edges of the blades 6 on the rear side in the rotation direction are separately received by the radio wave receiver 120B as illustrated in FIG. 1. Also, pitch angles of the blades 6 are set to be rotated by wind. Therefore, the radio waves emitted from the transmission antenna 104A for inspection of the first drone 100A during the rotation of the blade 6 are reflected by the surfaces of the blades 6 and are received as reflected waves by the reception antenna 104B for inspection of the second drone.

FIG. 2 illustrates an example of temporal variations in direct waves that are received by the radio wave receiver 120B in a case where the radio waves are emitted from the radio wave transmitter 120A toward the blade rotating surfaces 8. As illustrated in FIG. 2, the reception level of the direct waves received by the radio wave receiver 120B decreases at a constant cycle. Since the decrease in reception level occurs due to the direct waves being blocked by the blades 6, the cycle of the decrease in reception level corresponds to a rotation cycle of the blades 6.

Figure 3:
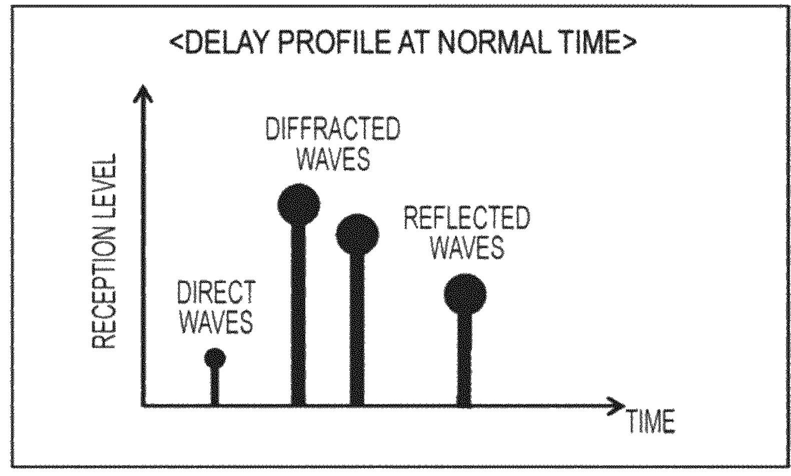
FIG. 3 is a diagram illustrating an example of delay profiles of a diffracted wave and a reflected wave that are obtained when the blades are normal in a case where a radio wave is emitted from the radio wave transmitter to the rotating surfaces of the blades.

Each of the diffracted waves and the reflected waves reaches the radio wave receiver 120B through a bent path with respect to the direct waves that reach the radio wave receiver 120B from the radio wave transmitter 120A at a shortest distance. Therefore, the clock time when the diffracted waves and the reflected waves are received by the radio wave receiver 120B is delayed with respect to the clock time when the direct waves are received by the radio wave receiver 120B. Since the three blades 6 included in the wind power plant 4 have the same shape, the delay time patterns of the diffracted waves and the reflected waves with respect to the direct waves are substantially common to the blades 6. Also, since there are no differences in radio wave diffraction state and reflection state among the blades 6, each of the reception levels of the direct waves, the diffracted waves, and the reflected waves received by the radio wave receiver 120B is also substantially common among the blades 6. As a result, the delay profiles of the diffracted waves and the reflected waves as illustrated as an example in FIG. 3 should be obtained for all the blades 6 in a case where the radio waves are emitted from the radio wave transmitter 120A toward the blade rotating surfaces 8 if each blade 6 is normal.

Figure 4:
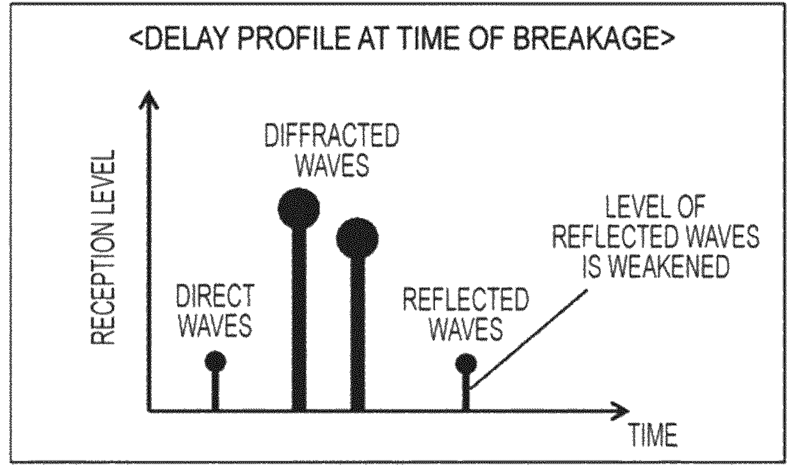
FIG. 4 is a diagram illustrating an example of delay profiles of a diffracted wave and a reflected wave obtained when the blades are broken in a case where a radio wave is emitted from the radio wave transmitter to the rotating surfaces of the blades.

However, in a case where an abnormality such as scratches, cracking, degradation due to defects, or the like has occurred on the surfaces of the blades 6, the diffraction state in a case where the radio waves are diffracted by the blades 6 and the reflection state in a case where the radio waves are reflected by the surfaces of the blades 6 change. For example, there may be a case where scratches on the surfaces of the blades 6 degrade the signal level of the reflected waves by changing the dielectric constant or changing a reflection direction of the reflected waves. FIG. 4 illustrates an example of delay profiles of the diffracted waves and the reflected waves obtained when the blades 6 break in a case where the radio waves are emitted from the radio wave transmitter 120A toward the blade rotating surfaces 8. Although the reception level of the reflected waves received by the radio wave receiver 120B decreases in this example, there may also be a case where a phase difference of the reflected waves with respect to the direct waves changes. Moreover, there may also be a case where the reception level of the diffracted waves decreases or the phase difference of the diffracted waves with respect to the direct waves changes. Furthermore, these may occur in combination depending on how the blades 6 have broken.

As described above, the breakage or degradation of the blades 6 changes the delay profile of the diffracted waves or the reflected waves. This point is focused on in the blade inspection method according to the present embodiment. According to the blade inspection method of the present embodiment, the radio waves are emitted from the radio wave transmitter 120A toward the blade rotating surfaces 8 in a state where the first drone 100A and the second drone 100B face each other with the blade rotating surfaces 8 sandwiched therebetween first. Next, at least either the reflected waves or the diffracted waves generated by the blades 6 due to emission of the radio waves from the radio wave transmitter 120A are received by the radio wave receiver 120B. Also, whether or not there is an abnormality in the blades 6 is determined through analysis processing of the reflected waves or the diffracted waves received by the radio wave receiver 120B. According to such a method, it is possible to perform the inspection of the blades 6 without being affected by the rotation speed of the blades 6 and weathers.

2. Configuration of Blade Inspection System

Figure 5:
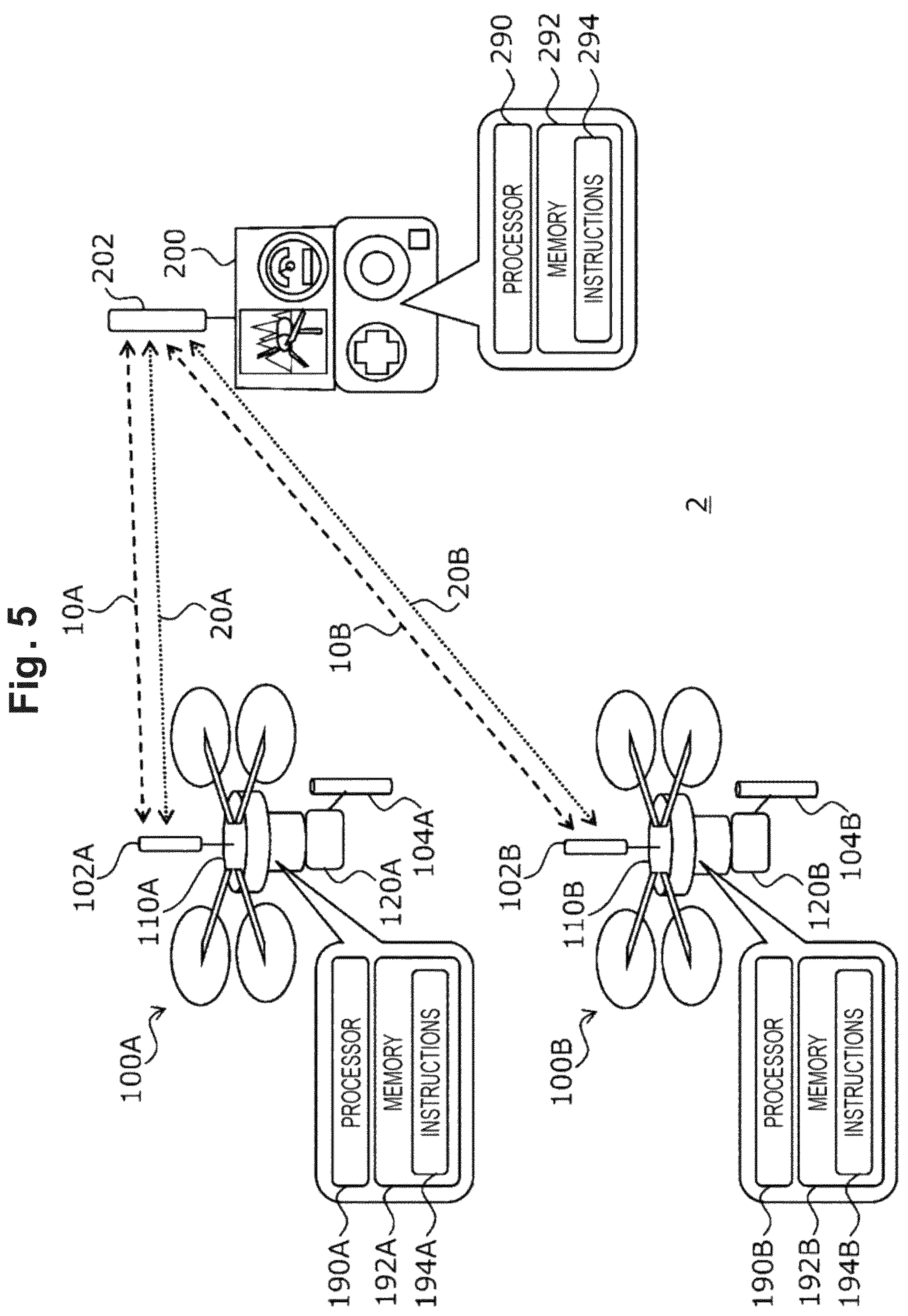
FIG. 5 is a diagram illustrating an outline of an inspection system for blades of a wind power plant according to the embodiment of the present disclosure.

Next, a blade inspection system in which the above blade inspection method is performed will be described. FIG. 5 is a diagram illustrating an outline of a blade inspection system 2 according to the present embodiment. The blade inspection system 2 according to the present embodiment includes the first drone 100A and the second drone 100B, and an investigation and inspection control device 200 that controls them.

The first drone 100A includes a drone main body 110A that has basic structures of a drone such as a rotor blade, a motor, a speed controller, and a flight controller and a radio wave transmitter 120A that is attached to the drone main body 110A. An aerial 102A for controlling the drone is attached to the drone main body 110A. Also, the first drone 100A includes therein a processor 190A that is communicatively coupled at least to the radio wave transmitter 120A and a memory 192A that is communicatively coupled to the processor 190A. The memory 192A stores a plurality of executable instructions 194A.

The processor 190A may be a central processing unit (CPU), a field programmable gate array (FPGA), an application specific integrated circuit (ASIC), or another processing unit. Alternatively, the processor 190A may be a combination of two or more of the CPU, the FPGA, the ASIC, and another processing unit. Once the instructions 194A stored in the memory 192A are executed, the processor 190A which is the CPU, the FPGA, the ASIC, or another processing unit is triggered to execute functions, which will be described later. Note that the memory 192A may be a device that is different from the processor 190A or may be incorporated in the processor 190A.

The second drone 100B includes a drone main body 110B that has basic structures of a drone such as a rotary blade, a motor, a speed controller, and a flight controller and a radio wave receiver 120B that is attached to the drone main body 110B. An aerial 102B for controlling the drone is attached to the drone main body 110B. Also, the second drone 100B includes therein a processor 190B that is communicatively coupled at least to the radio wave receiver 120B and a memory 192B that is communicatively coupled to the processor 190B. The memory 192B stores a plurality of executable instructions 194B. The processor 190B may be a CPU, an FPGA, an ASIC, or another processing unit, or may be a combination of two or more of the CPU, the FPGA, the ASIC, and another processing unit. The memory 192B may be a device that is different from the processor 190B or may be incorporated in the processor 190B.

The investigation and inspection control device 200 is configured to navigate the two drones 100A and 100B by itself and cause the drones 100A and 100B to inspect the blades 6. The investigation and inspection control device 200 includes an aerial 202 for controlling the drones. A signal line 10A for controlling flight and a signal line 20A for controlling investigation and inspection are established between the aerial 202 of the investigation and inspection control device 200 and the aerial 102A of the first drone 100A. A signal line 10B for controlling flight and a signal line 20B for controlling investigation and inspection are established between the aerial 202 of the investigation and inspection control device 200 and the aerial 102B of the second drone 100B. The investigation and inspection control device 200 includes therein a processor 290 and a memory 292 that is communicatively coupled to the processor 290. The memory 292 stores a plurality of executable instructions 294. The processor 290 may be a CPU, an FPGA, an ASIC, or another processing unit, or may be a combination of two or more of the CPU, the FPGA, the ASIC, and another processing unit. The memory 292 may be a device that is different from the processor 290 or may be incorporated in the processor 290.

FIG. 6 is a block diagram illustrating a configuration of the blade inspection system 2. In FIG. 6, the configurations that the drone 100 has and the configurations that the investigation and inspection control device 200 has are represented by blocks. The configurations of the drone 100 illustrated in FIG. 6 is configurations of both the first drone 100A and the second drone 100B. The first drone 100A and the second drone 100B basically have the same configurations, an application for transmission of the drone 100 corresponds to the first drone 100A, and an application for reception of the drone 100 corresponds to the second drone 100B.

The investigation and inspection control device 200 includes an investigation and inspection control unit 210, a flight control unit 220, a flight control wireless transmission/reception unit 230, a radio wave transmission/reception control unit 240, an investigation and inspection control wireless transmission/reception unit 250, and a drone control aerial 202. The investigation and inspection control unit 210 is also an HMI that receives an input from an operator and provides information to the operator. The investigation and inspection control unit 210 is coupled to the flight control unit 220 and the radio wave transmission/reception control unit 240.

The investigation and inspection control unit 210 inputs a navigation command from the operator to the flight control unit 220. The flight control unit 220 generates an order for causing the drone 100 to fly in response to the navigation command. The flight control command generated by the flight control unit 220 is output from the drone control aerial 202 to the flight control signal line 10 by the flight control wireless transmission/reception unit 230. Also, information regarding the flight state of the drone 100 issued by the drone 100 is input from the flight control signal line 10 to the flight control wireless transmission/reception unit 230 via the drone control aerial 202. The flight control unit 220 inputs the information regarding the flight state received by the flight control wireless transmission/reception unit 230 to the investigation and inspection control unit 210. The investigation and inspection control unit 210 saves the input information regarding the flight state in a storage device or displays it on a display device.

The investigation and inspection control unit 210 inputs a command to start inspection from the operator to the radio wave transmission/reception control unit 240. Alternatively, the investigation and inspection control unit 210 itself determines whether or not to start the inspection on the basis of the information regarding the flight state of the drone 100 and inputs a command to start the inspection to the radio wave transmission/reception control unit 240. The radio wave transmission/reception control unit 240 generates an inspection order in response to the command to start the inspection. The inspection order generated by the radio wave transmission/reception control unit 240 is output from the drone control aerial 202 to the investigation and inspection control signal line 20 by the investigation and inspection control wireless transmission/reception unit 250. Also, inspection data issued by the drone 100 is input from the investigation and inspection control signal line 20 to the investigation and inspection control wireless transmission/reception unit 250 via the drone control aerial 202. The radio wave transmission/reception control unit 240 inputs the inspection data received by the investigation and inspection control wireless transmission/reception unit 250 to the investigation and inspection control unit 210. The investigation and inspection control unit 210 saves the input inspection data in the storage device or displays it on the display device.

In the aforementioned configurations of the investigation and inspection control device 200, at least the investigation and inspection control unit 210, the flight control unit 220, and the radio wave transmission/reception control unit 240 are implemented by the processor 290. The investigation and inspection control unit 210, the flight control unit 220, and the radio wave transmission/reception control unit 240 may be configured by individual processors 290, or more than one of them may be configured by one processor 290. Note that in a case where the processor 290 is a CPU, for example, the program including the instructions 294 may be provided via a network.

The drone 100 includes a drone main body 110, a drone control aerial 102, and a battery 130. The flight control order issued from the investigation and inspection control device 200 is input from the flight control signal line 10 to the drone main body 110 via the drone control aerial 102. The flight controller configuring the drone main body 110 controls a speed controller of each motor on the basis of the flight control order. A power source for causing the motor to operate is supplied from the battery 130 to the speed controller. Also, the information regarding the flight state of the drone 100 issued from the flight controller is output from the drone control aerial 102 to the flight control signal line 10.

The drone 100 further includes an investigation and inspection control wireless transmission/reception unit 140, a processing unit 150, a transmission order unit 160, a radio wave transceiver 120, an inspection transmission/reception antenna 104, a received signal analysis processing unit 170, and a storage unit 180. The radio wave transceiver 120 includes a radio wave transmission unit 122 and a radio wave reception unit 124. The inspection command issued from the investigation and inspection control device 200 is input from the investigation and inspection control signal line 20 to the investigation and inspection control wireless transmission/reception unit 140 via the drone control aerial 102. The investigation and inspection control wireless transmission/reception unit 140 inputs the received order to the processing unit 150.

Details of the processing performed by the processing unit 150 differ depending on whether the drone 100 is operated as the first drone 100A or is operated as the second drone 100B. In a case where the drone 100 is operated as the first drone 100A, the processing unit 150 actuates the transmission order unit 160 in response to the inspection command. The actuated transmission order unit 160 issues a radio wave transmission order to the radio wave transmission unit 122. The radio wave transmission unit 122 emits radio waves from the inspection transmission/reception antenna 104 in response to the radio wave transmission order. In this case, the radio wave transceiver 120 functions as the radio wave transmitter 120A, and the inspection transmission/reception antenna 104 functions as the inspection transmission antenna 104A.

In a case where the drone 100 is operated as the second drone 100B, the processing unit 150 actuates the radio wave reception unit 124 and the received signal analysis processing unit 170 in response to the inspection order. The radio wave reception unit 124 receives the radio waves input to the inspection transmission/reception antenna 104. At the time of the inspection of the blades 6, the radio waves received by the radio wave reception unit 124 include direct waves, diffracted waves, and reflected waves. In this case, the radio wave transceiver 120 functions as the radio wave receiver 120B, and the inspection transmission/reception antenna 104 functions as the inspection reception antenna 104B. The received signal analysis processing unit 170 analyzes the received radio waves and stores the analysis result in the storage unit 180. The storage unit 180 is, for example, a storage such as a flash memory or a hard disk. Although specific details of the received signal analysis processing performed by the received signal analysis processing unit 170 will be described later, whether or not there is an abnormality in the blades 6 is determined from the analysis result. The analysis result stored in the storage unit 180 is output from the investigation and inspection control wireless transmission/reception unit 140 to the flight control signal line 10 via the drone control aerial 102.

In the aforementioned configurations of the drone 100, at least the processing unit 150, the transmission order unit 160, and the received signal analysis processing unit 170 are implemented by the processor. The processing unit 150, the transmission order unit 160, and the received signal analysis processing unit 170 may be configured by the individual processors, or more than one of them may be configured by one processor. In a case where the drone 100 is operated as the first drone 100A, the processing unit 150 and the transmission order unit 160 may be configured by the individual processors 190A, or one processor 190A may configure the processing unit 150 and the transmission order unit 160. In a case where the drone 100 is operated as the second drone 100B, the processing unit 150 and the received signal analysis processing unit 170 are configured by the individual processors 190B, or one processor 190B configures the processing unit 150 and the received signal analysis processing unit 170. Note that in a case where each of the processors 190A and 190B is a CPU, for example, the program including the instructions 194A and the program including the instructions 194B may be provided via a network.

3. Operations of Blade Inspection System

Figure 7:
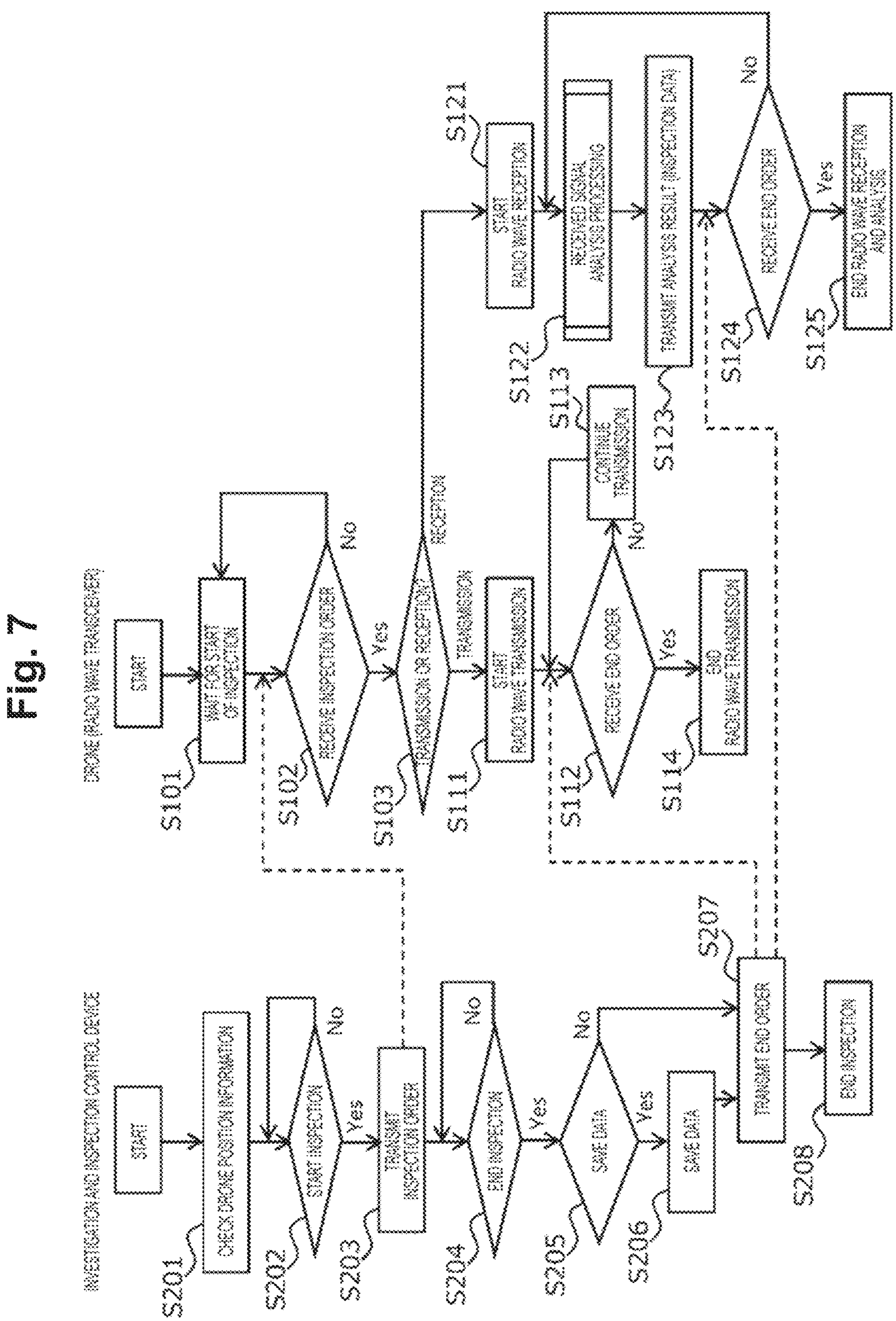
FIG. 7 is a flowchart illustrating an operation flow of the inspection system for blades of a wind power plant according to the embodiment of the present disclosure.

Next, operations of the blade inspection system 2 configured as described above will be described by using a flowchart. FIG. 7 illustrates a flowchart illustrating an operation flow of the investigation and inspection control device 200 and also illustrates a flowchart illustrating an operation flow of the drone 100, particularly of the radio wave transceiver 120.

According to the operation flow of the investigation and inspection control device 200, position information of the two drones 100A and 100B is checked first in Step S201. In Step S202, whether or not to start the blade inspection is determined on the basis of the position information checked in Step S201. Specifically, it is determined that the blade inspection is to be started in response to confirmation that the first drone 100A and the second drone 100B face each other with the blade rotating surfaces 8 sandwiched therebetween. The determination may be made by the investigation and inspection control unit 210, or an input from the operator may be received. Whether the first drone 100A and the second drone 100B face each other with the blade rotating surfaces 8 sandwiched therebetween can be determined from the reception state of the radio waves, which have been emitted from the first drone 100A, in the second drone 100B. Also, in a case where a camera is mounted on at least one of the two drones 100A and 100B, it is possible to check the positional relationship therebetween with respect to the blade rotating surfaces 8 from a camera image.

In a case where it is determined that the blade inspection is to be started in Step S202, an inspection order is transmitted from the investigation and inspection control device 200 to the drone 100 in Step S203. The inspection order is transmitted to both the first drone 100A and the second drone 100B at the same time.

Here, operations of each of the drones 100A and 100B after the inspection order is received will be described. The two drones 100A and 100B fly to the positions where the drones 100A and 100B face each other with the blade rotating surfaces 8 sandwiched therebetween and then wait for the start of the inspection while hovering. In other words, as illustrated in the operation flow of the drone 100, each of the drones 100A and 100B is brought into a standby state for the start of the inspection first in Step S101. Then, in Step S102, whether or not the inspection order from the investigation and inspection control device 200 has been received is determined. The standby state of each of the drones 100A and 100B is maintained until the inspection order is received.

In a case where the inspection order is received in Step S102, whether or not to perform transmission processing or to perform reception processing is determined in Step S103. The determination is made by the processing unit 150. In a case of the first drone 100A that causes the radio wave transceiver 120 to function as the radio wave transmitter 120A, the operation flow proceeds to Step S111 to perform the transmission processing. The operation flow from Step S111 to Step S114 is the operation flow of the first drone 100A.

In Step S111, the radio wave transmitter 120A of the first drone 100A starts to transmit radio waves. In Step S112, whether or not an end order from the investigation and inspection control device 200 has been received is determined. The end order is an order to cause the drones 100A and 100B to end the blade inspection. The transmission of radio waves from the radio wave transmitter 120A is continued in Step S113 until the end order is received.

In a case of the second drone 100B that causes the radio wave transceiver 120 to function as the radio wave receiver 120B, the operation flow proceeds from Step S103 to Step S121 in order to perform the reception processing. The operation flow from Step S121 to Step S125 is the operation flow of the second drone 100B.

In Step S121, the radio wave receiver 120B of the second drone 100B starts to receive the radio waves. In Step S122, the analysis processing is performed on the radio waves received by the radio wave receiver 120B. The received signal analysis processing executed in Step S122 will be described later in detail. Next, in Step S123, the analysis result of the received signal analysis processing, that is, inspection data indicating the result of the blade inspection is transmitted to the investigation and inspection control device 200. However, the processing in Step S123 may be storing of the analysis result in the storage unit 180 instead of the transmitting of the analysis result. In Step S124, whether or not an end command from the investigation and inspection control device 200 has been received is determined. The processing in Step S122 and Step S123 is repeated until the end order is received.

The operation flow returns to that of the investigation and inspection control device 200 again. After the transmission of the inspection order to the drones 100A and 100B, whether or not to end the blade inspection is determined in Step S204. The determination may be made by the investigation and inspection control unit 210, or an input from the operator may be received. For example, the investigation and inspection control unit 210 may automatically end the blade inspection in response to the transmission of the inspection data indicating the result of the blade inspection from the second drone 100B, or the operator may check the inspection data and end the blade inspection. In addition, there may be a case where the blade inspection is forcibly ended before the inspection data is obtained depending on an operator's determination.

In a case where the blade inspection is to be ended, whether or not to save the inspection data transmitted from the second drone 100B is determined in following Step S205. In a case of a positive determination in Step S205, the inspection data is saved in the storage included in the investigation and inspection control device 200 in Step S206. Whether or not to save the inspection data can be arbitrarily determined. The inspection data may not be saved if it is possible to determine that there is obviously no abnormality in the blades 6 as a result of checking the inspection data, for example. On the other hand, the inspection data may be saved if it is possible to determine that there may be an abnormality in the blades 6.

In Step S207 after determining whether or not to save the inspection data, the end order is transmitted from the investigation and inspection control device 200 to both the first drone 100A and the second drone 100B. Then, the blade inspection is ended in Step S208 in response to the transmission of the end order.

The determination in Step S112 changes from negative to positive determination in response to the reception of the end order, which has been received from the investigation and inspection control device 200, in the first drone 100A. In this manner, the transmission of the radio waves from the radio wave transmitter 120A is ended in Step S114.

Also, the determination in Step S124 changes from negative to positive determination in response to the reception of the end order, which has been transmitted from the investigation and inspection control device 200, in the second drone 100B. In this manner, the reception of the radio waves by the radio wave receiver 120B and the analysis processing performed by the received signal analysis processing unit 170 are ended in Step S125.

4. Received Signal Analysis Processing 4-1. First Specific Example

Next, the received signal analysis processing performed by the received signal analysis processing unit 170 in a case where the drone 100 functions as the second drone 100B will be specifically described. The received signal analysis processing is analysis processing performed on reflected waves or diffracted waves in order to determine whether or not there is an abnormality in the blades 6 from the radio waves received by the radio wave receiver 120B. Here, the analysis processing performed on the reflected waves, particularly the analysis processing based on the reception level of the reflected waves will be described.

Figure 8:
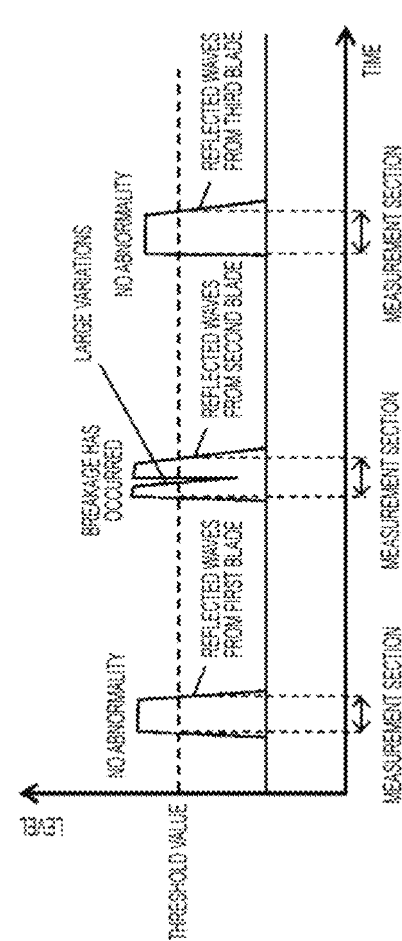
FIG. 8 is a diagram illustrating an example of temporal variations in level of a reflected wave received by the radio wave receiver in a case where a radio wave is emitted from the radio wave transmitter to the rotating surfaces of the blades.

FIG. 8 is a diagram illustrating an example of temporal variations in level of the reflected waves received by the radio wave receiver 120B in a case where the radio waves are emitted from the radio wave transmitter 120A toward the blade rotating surfaces 8. In a case where the second blade has broken from among the three blades, the reflected waves from the second blade show a profile that is different from those of the reflected waves from the first blade and the third blade. In the example illustrated in FIG. 8, large variations have occurred only in the reception level of the second blade. In a first specific example of the received signal analysis processing, whether or not there is an abnormality in the blades 6 is determined by detecting such abnormal variations in reception level.

Figure 9:
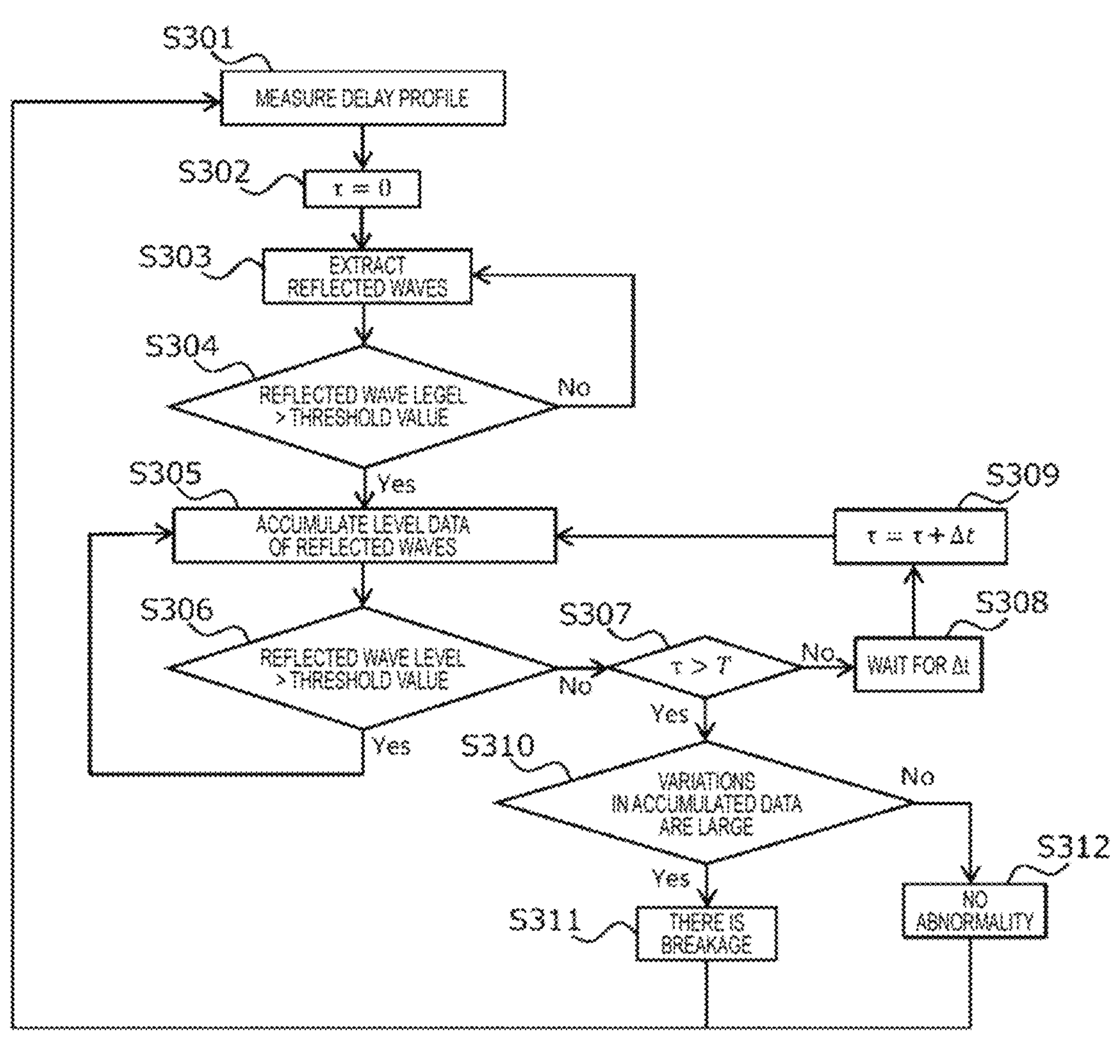
FIG. 9 is a flowchart illustrating a processing flow in a first specific example of received signal analysis processing.

FIG. 9 is a flowchart illustrating a processing flow in the first specific example of the received signal analysis processing. First, in Step S301, a delay profile of the radio waves received by the radio wave receiver 120B is measured. Also, in Step S302, a counter t for determining an end of a measurement section illustrated in FIG. 8 is initialized.

In Step S303, the reflected waves are extracted from the delay profile measured in Step S301. A specific example of a method of extracting the reflected waves will be described later. Next, whether or not the reception level of the extracted reflected waves has increased over a threshold value is determined in Step S304. The threshold value used in Step S304 is a threshold value for detecting rising of the reflected waves. Step S303 and Step S304 are repeated until the reception level of the reflected waves increases over the threshold value. The increase in the reception level of the reflected waves over the threshold value means a start of the measurement section.

In a case where the reception level of the reflected waves increases over the threshold value, the processing flow proceeds to Step S305 after the loop of Step S303 and Step S304. In Step S305, data of the reception level of the reflected waves for each time is accumulated. Next, whether or not the state where the reception level of the extracted reflected waves is greater than a threshold value is maintained is determined in Step S306. The threshold value used in Step S306 is a threshold value for detecting falling of the reflected waves. The value as the threshold value may be the same value as the threshold value used in Step S304. Step S305 and Step S306 are repeated until the reception level of the reflected waves becomes equal to or less than the threshold value.

Examples of the case where the reception level of the reflected waves becomes equal to or less than the threshold value includes a case where the blades have passed and the measurement section ends and a case where the reception level of the reflected waves varies due to breakage of the blades as illustrated in FIG. 8. The state where the reception level is equal to or less than the threshold value continues in the former case, while the decrease in reception level temporarily occurs in the latter case. Therefore, an elapse period of time after the reception level of the reflected waves becomes equal to or less than the threshold value is measured in order to distinguish the cases. A parameter used to measure the elapse time is the counter initialized in Step S302.

In a case where the reception level of the reflected waves becomes equal to or less than the threshold value in Step S306, whether or not the counter t has exceeded a predetermined time T is determined in Step S307. The predetermined time T is a time according to which it is possible to determine that the measurement section has ended if the time when the reception level of the reflected waves is below the threshold value exceeds the time. The predetermined time T can be set on the basis of the rotation speed of the blades 6 and the width of the blades 6. In a case where the counter τ does not exceed the predetermined time T, a waiting time of Δt is given in Step S308. In Step S309, the counter τ is updated by adding the waiting time Δt to the counter τ.

Steps S305 to S309 are repeated until the counter τ exceeds the predetermined time T in the determination in Step S307. Then, it is determined that the measurement section of the reflected waves has ended when the counter τ exceeds the predetermined time T, and the processing flow proceeds to Step S310 after the loop of Steps S305 to S309. In Step S310, whether or not variations in data of the reception level accumulated in the measurement section are large is determined. Specifically, whether or not dispersion or standard deviation of the accumulated data of the reception level is greater than a predetermined reference value is determined.

The variations in data of the reception level accumulated in the measurement section represent whether or not there is an abnormality in the blade corresponding to the measurement section. In a case where variations in data of the reception level are large, it is determined that there is breakage in the blade corresponding to the measurement section in Step S311. In a case where variations in data of the reception level are not large, it is determined that there is no abnormality in the blade corresponding to the measurement section in Step S312.

The first specific example of the received signal analysis processing having the above processing flow can also be applied to analysis processing based on a reception level of diffracted waves.

4-2. Second Specific Example

Next, a second specific example of the received signal analysis processing executed by the received signal analysis processing unit 170 will be described. Here, analysis processing performed on reflected waves, particularly analysis processing based on a phase difference of the reflected waves with respect to the direct waves will be described.

Figure 10:
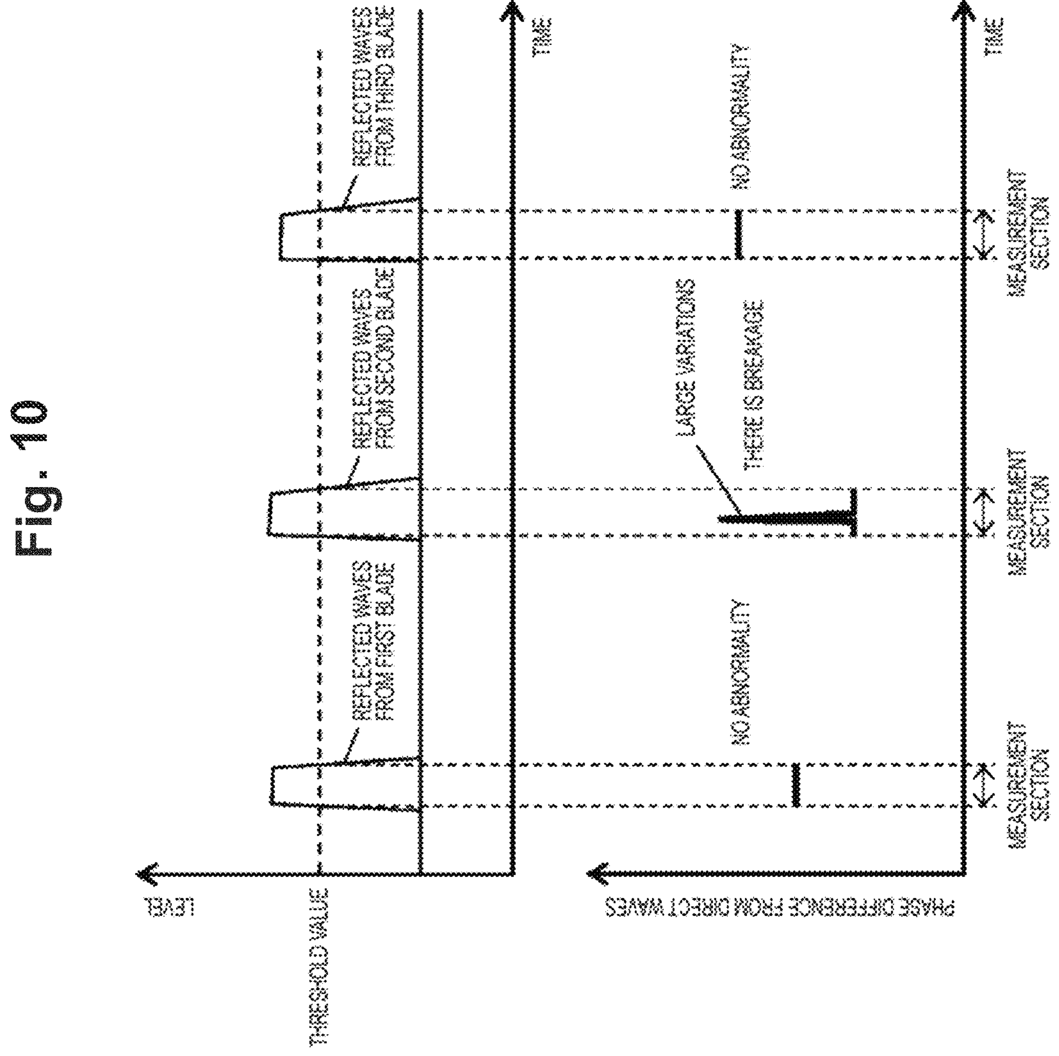
FIG. 10 is a diagram illustrating an example of temporal variations in phase difference of the reflected wave received by the radio wave receiver with respect to a direct wave in a case where a radio wave is emitted from the radio wave transmitter to the rotating surfaces of the blades.

FIG. 10 is a diagram illustrating an example of temporal variations in phase difference of the reflected waves received by the radio wave receiver 120B with respect to the direct waves in a case where the radio waves are emitted from the radio wave transmitter 120A toward the blade rotating surfaces 8. In a case where the second blade has broken from among the three blades, the reflected waves from the second blade show a profile that is different from those of the reflected waves from the first blade and the third blade. In the example illustrated in FIG. 10, large variations have occurred in the phase difference of the reflected waves with respect to the direct waves only in the second blade. In the second specific example of the received signal analysis processing, whether or not there is an abnormality in the blades 6 is determined by detecting abnormal variations in phase difference of the reflected waves with respect to the direct waves.

Figure 11:
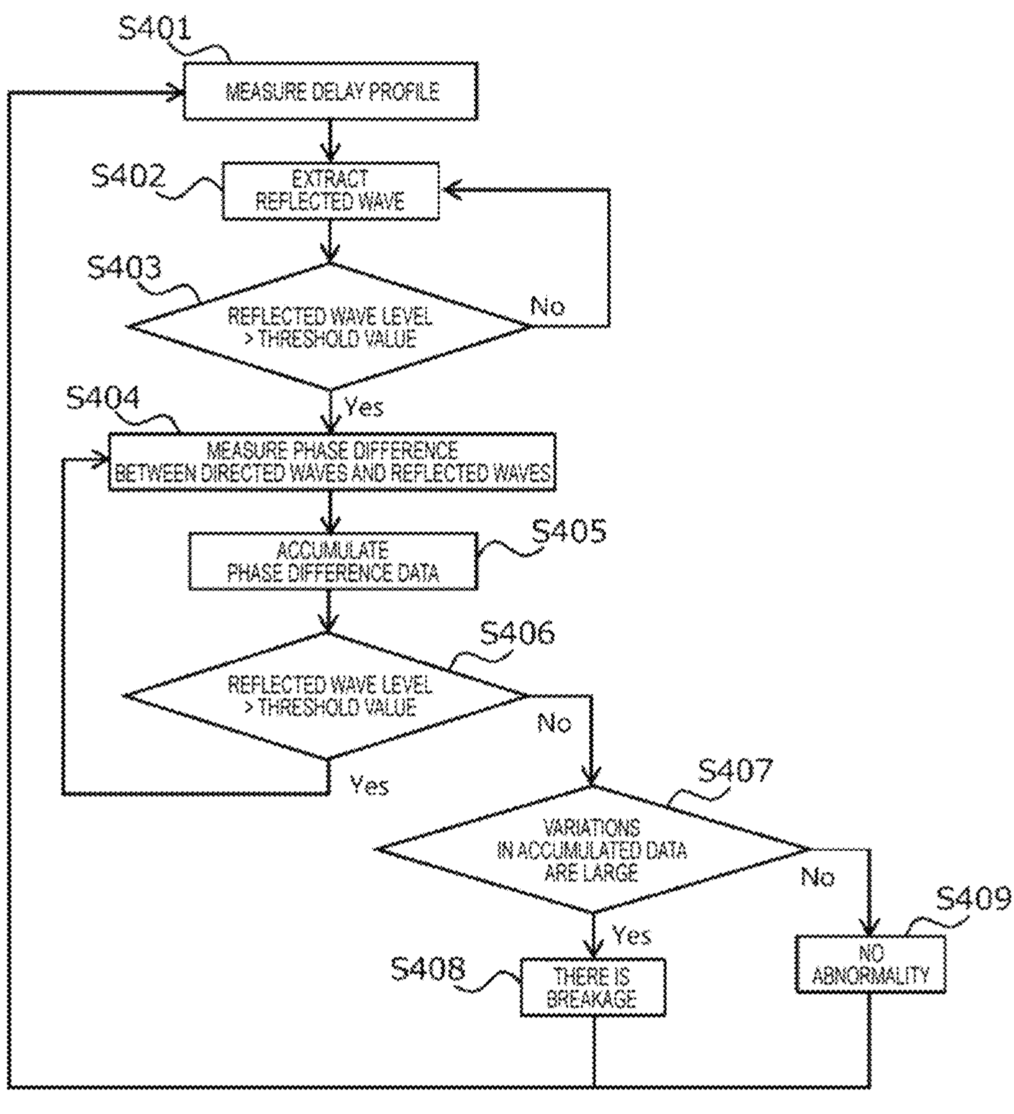
FIG. 11 is a flowchart illustrating a processing flow in a second specific example of the received signal analysis processing.

FIG. 11 is a flowchart illustrating a processing flow in the second specific example of the received signal analysis processing. First, in Step S401, a delay profile of the radio waves received by the radio wave receiver 120B is measured. In Step S402, the reflected waves are extracted from the delay profile measured in Step S401. A specific example of a method of extracting the reflected waves will be described later. Next, whether or not the reception level of the extracted reflected waves has increased over a threshold value is determined in Step S403. The threshold value used in Step S403 is a threshold value for detecting rising of the reflected waves. Step S402 and Step S403 are repeated until the reception level of the reflected waves increases over the threshold value. The increase in the reception level of the reflected waves over the threshold value means a start of the measurement section.

In a case where the reception level of the reflected waves becomes greater than the threshold value, the processing flow proceeds to Step S404 after the loop of Step S402 and Step S403 is ended. In Step S404, the phase difference of the reflected waves with respect to the direct waves is measured. In Step S405, data of the phase difference measured in Step S404 is accumulated. Next, whether or not the state where the reception level of the extracted reflected waves is greater than the threshold value is maintained is determined in Step S406. The threshold value used in Step S406 is a threshold value for detecting falling of the reflected waves. The value as the threshold value may be the same value as the threshold value used in Step S403. Steps S404 to S406 are repeated until the reception level of the reflected waves becomes equal to or less than the threshold value.

In a case where the reception level of the reflected waves becomes equal to or less than the threshold value in Step S406, it is determined that the measurement section of the reflected waves has ended, and the processing flow proceeds to Step S407 after the loop of Steps S404 to S406 ends. In Step S407, whether variations in data of the phase difference accumulated in the measurement section are large is determined. Specifically, whether dispersion or standard deviation of the accumulated data of the phase difference is greater than a predetermined reference value is determined.

The variations in data of the phase difference accumulated in the measurement section represents whether or not there is an abnormality in the blade corresponding to the measurement section. In a case where variations in data of the reception level are large, it is determined that there is breakage in the blade corresponding to the measurement section in Step S408. In a case where variations in data of the reception level are not large, it is determined that there is no abnormality in the blade corresponding to the measurement section in Step S409.

The second specific example of the received signal analysis processing having the above processing flow can also be applied to analysis processing based on a phase difference of the diffracted waves with respect to the direct waves. In addition, it is also possible to determine whether or not there is an abnormality in the blades by employing the first specific example and the second specific example of the received signal analysis processing together.

5. Filter for Extracting Delayed Waves

Figure 12:
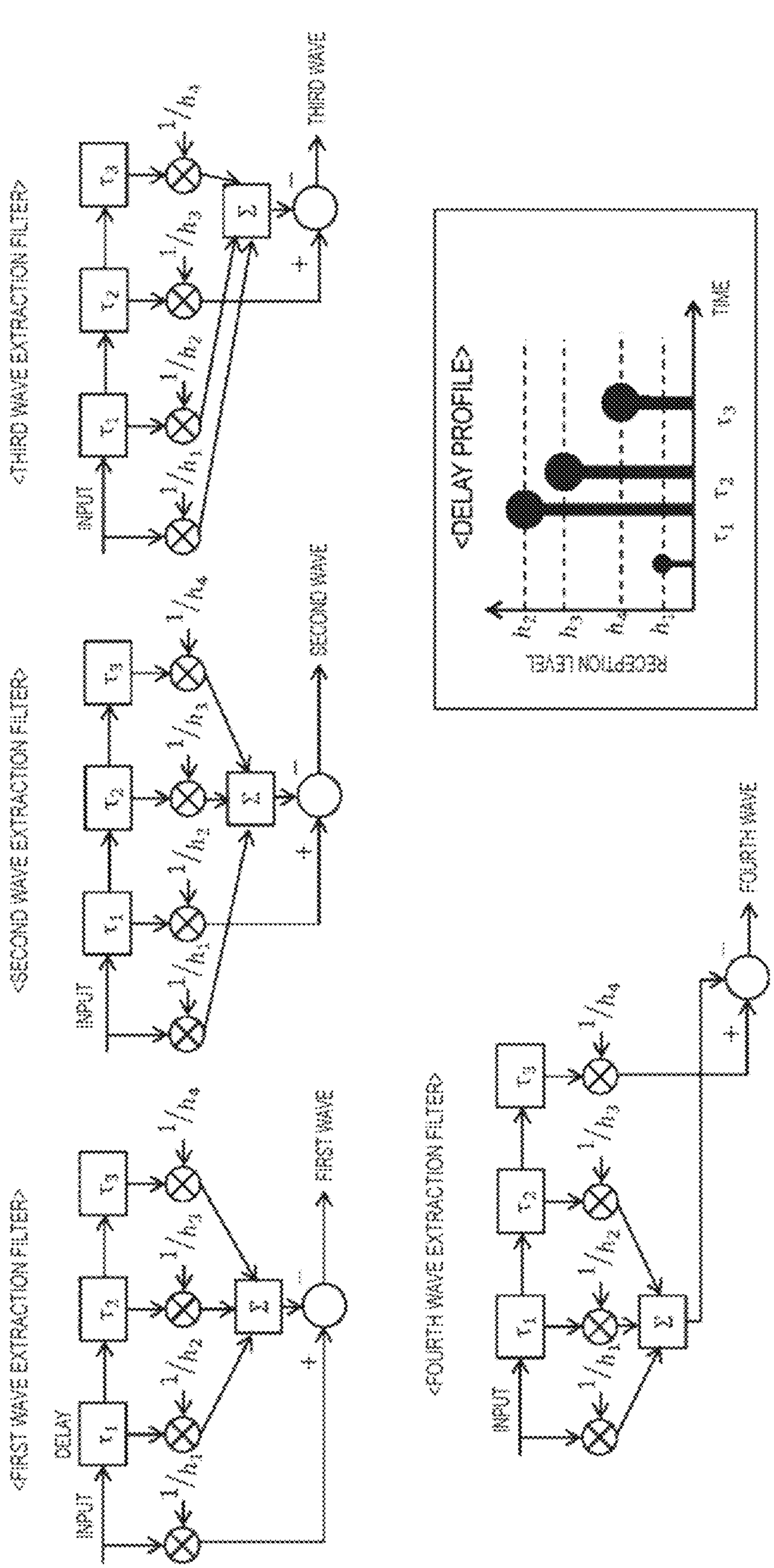
FIG. 12 is a diagram illustrating an example of a filter that extracts a delayed wave.

As a means for extracting the diffracted waves and the reflected waves from the radio waves received by the radio wave receiver 120B, it is possible to use a transversal filter illustrated in FIG. 12, for example. FIG. 12 depicts a filter configured to extract a first wave, a filter configured to extract a second wave, a filter configured to extract a third wave, and a filter configured to extract a fourth wave.

Also, FIG. 12 illustrates, as an example, delay profiles of the first wave to the fourth wave. A reception level $h_1$ of the first wave, a reception level $h_2$ of the second wave, a reception level $h_3$ of the third wave, and a reception level $h_4$ of the fourth wave illustrated in the delay profiles are measured values at a normal time. Also, a delay time $\tau_1$ of the second wave with respect to the first wave, a delay time $\tau_2$ of the third wave with respect to the second wave, and a delay time $\tau_3$ of the fourth wave with respect to the third wave indicated by the delay profile are also measured values at the normal time. Each filter is created using these values.

6. Modification of Inspection System for Blades 6-1. First Modification

Finally, a modification of the blade inspection system according to the present embodiment will be described by using a drawing. In the drawing illustrating the modification, elements common to those of the blade inspection system 2 are denoted by common reference signs.

Figure 13:
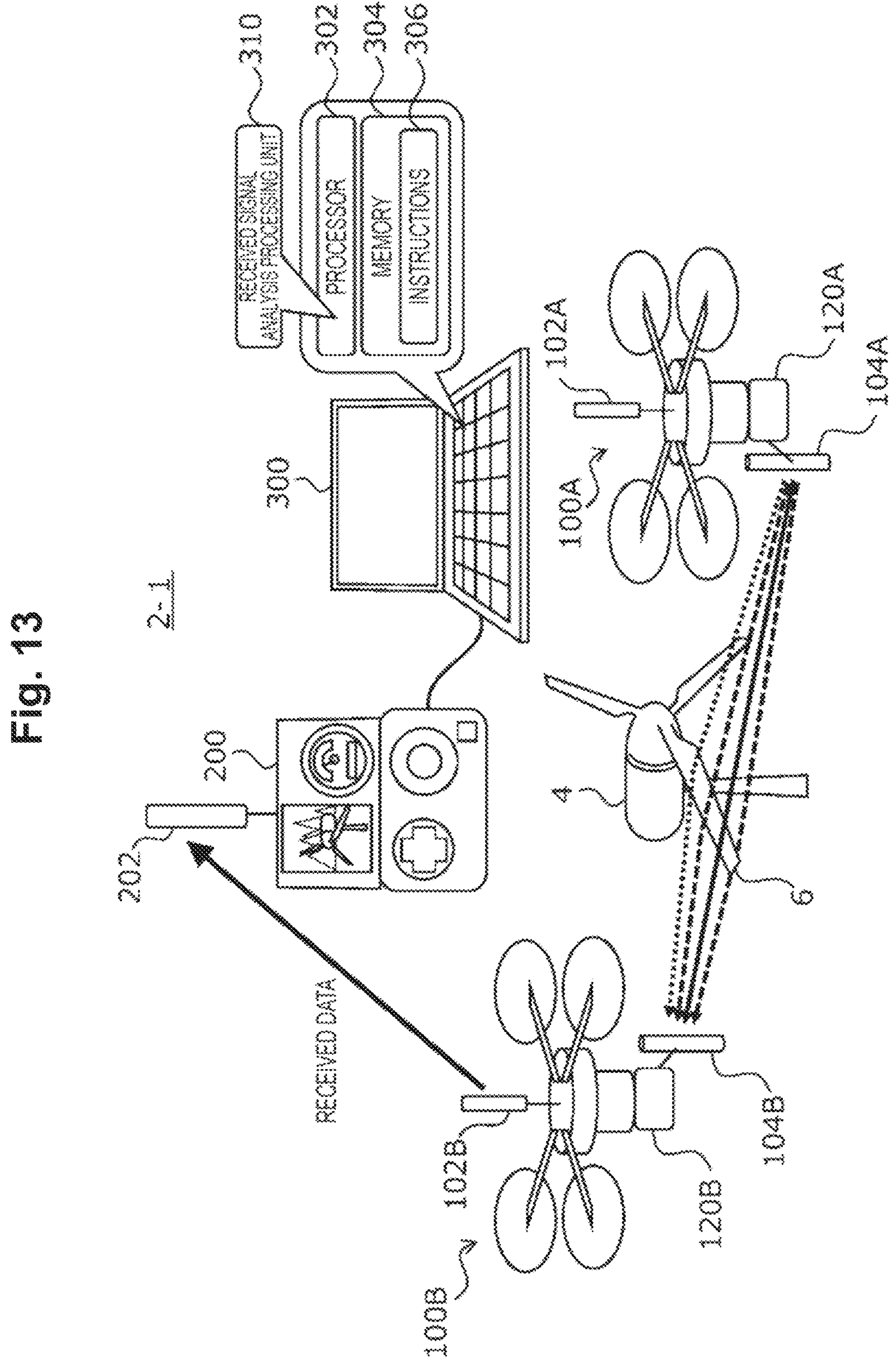
FIG. 13 is a diagram illustrating a configuration of a first modification of the inspection system for blades of a wind power plant according to the embodiment of the present disclosure.

FIG. 13 is a diagram illustrating a configuration of the first modification of the blade inspection system according to the present embodiment. A blade inspection system 2-1 according to the first modification includes a first drone 100A including a radio wave transmitter 120A, a second drone 100B including a radio wave receiver 120B, an investigation and inspection control device 200, and an analysis computer 300. The analysis computer 300 includes therein a processor 302 and a memory 304 communicatively coupled to the processor 302. The memory 304 stores a plurality of executable instructions 306. The analysis computer 300 is connected to the investigation and inspection control device 200.

In the blade inspection system 2-1 according to the first modification, the second drone 100B does not include the received signal analysis processing unit. Therefore, received signal analysis processing for determining whether or not there is an abnormality in blades 6 is not performed in the second drone 100B. The second drone 100B transfers received data including direct waves, diffracted waves, and reflected waves received by the radio wave receiver 120B to the investigation and inspection control device 200.

The investigation and inspection control device 200 transfers the received data transmitted from the second drone 100B to the analysis computer 300. In the analysis computer 300, the processor 302 functions as the received signal analysis processing unit 310 by at least some of the plurality of instructions 306 being executed by the processor 302. In other words, the received signal analysis processing is performed by the analysis computer 300 in the blade inspection system 2-1 according to the first modification.

6-2. Second Modification

Figure 14:
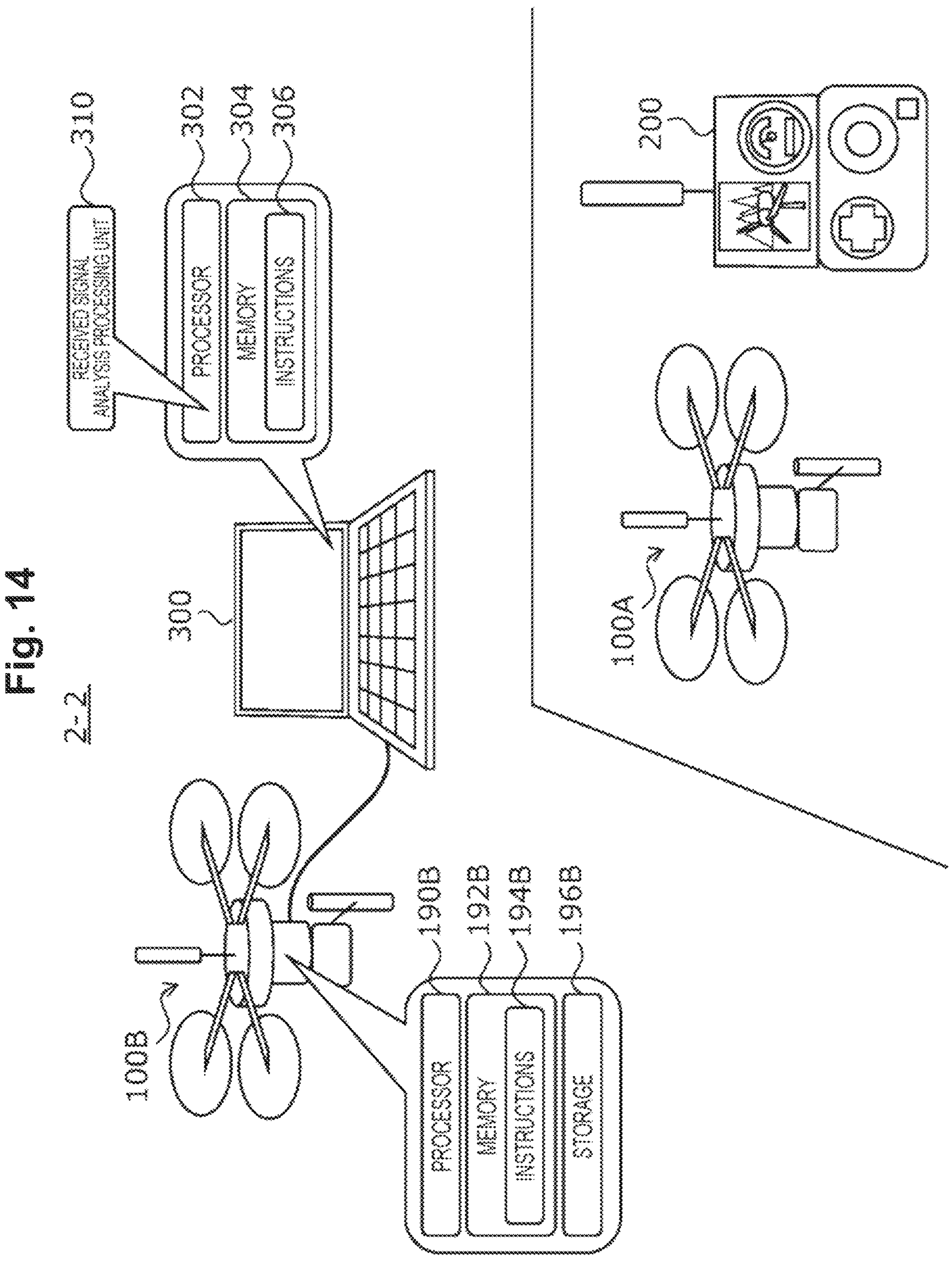
FIG. 14 is a diagram illustrating a configuration of a second modification of the inspection system for blades of a wind power plant according to the embodiment of the present disclosure.

FIG. 14 is a diagram illustrating a configuration of a second modification of the blade inspection system according to the present embodiment. A blade inspection system 2-2 according to the second modification includes a first drone 100A including a radio wave transmitter 120A, a second drone 100B including a radio wave receiver 120B, an investigation and inspection control device 200, and an analysis computer 300. The analysis computer 300 includes therein a processor 302 and a memory 304 communicatively coupled to the processor 302. The memory 304 stores a plurality of executable instructions 306.

In the blade inspection system 2-2 according to the second modification, the second drone 100B does not include the received signal analysis processing unit. Therefore, received signal analysis processing for determining whether or not there is an abnormality in blades 6 is not performed in the second drone 100B. The second drone 100B saves, in the storage 196B, received data including direct waves, diffracted waves, and reflected waves received by the radio wave receiver 120B.

The received data saved in the storage 196B of the second drone 100B can be transferred from the storage 196B to the analysis computer 300 by the second drone 100B and the analysis computer 300 being connected to each other. Also, in a case where the storage 196B is a memory card, for example, it is possible to transfer the received data to the analysis computer 300 by moving the memory card from the second drone 100B to the analysis computer 300. In the analysis computer 300, the processor 302 functions as the received signal analysis processing unit 310 by at least some of the plurality of instructions 306 being executed by the processor 302. In other words, the received signal analysis processing is performed by the analysis computer 300 in the blade inspection system 2-2 according to the second modification.

7. Others

Although radio waves are used for the blade inspection in the above embodiment, it is possible to use electromagnetic waves for the blade inspection as long as it is possible to obtain reflected waves and diffracted waves.

Although the two drones 100A and 100B are navigated by the one investigation and inspection control device 200 in the above embodiment, the investigation and inspection control device for controlling the first drone 100A and the investigation and inspection control device for controlling the second drone 100B may be different devices.

DESCRIPTION OF SYMBOLS

2, 2-1, 2-2 Blade inspection system
4 Wind power plant
6 Blade
8 Blade rotating surface
100 Drone (unmanned aerial vehicle)
100A First drone (first unmanned aerial vehicle)
100B Second drone (second unmanned aerial vehicle)
120 Radio wave transceiver
120A Radio wave transmitter
120B Radio wave receiver
170, 310 Received signal analysis processing unit
190A, 190B, 290, 302 Processor
192A, 192B, 292, 304 Memory
194A, 194B, 294, 306 Instructions
200 Investigation and inspection control device
300 Analysis computer

The invention claimed is:

1. A system for checking blades of a wind power plant, the system comprising:

a transmitter of electromagnetic waves that is mounted on a first unmanned aerial vehicle;

a receiver of electromagnetic waves that is mounted on a second unmanned aerial vehicle;

at least one processor that is communicatively coupled to the transmitter and the receiver; and a memory that is communicatively coupled to the at least one processor and stores a plurality of executable instructions, wherein the plurality of instructions are configured to cause the at least one processor to emit electromagnetic waves from the transmitter toward rotating surfaces of the blades in a state where the first unmanned aerial vehicle and the second unmanned aerial vehicle face each other with the rotating surface sandwiched therebetween, receive, by the receiver, at least one of a reflected wave and a diffracted wave generated by the blades due to emission of the electromagnetic wave from the transmitter, and determine whether or not there is an abnormality in the blades through analysis processing of the reflected wave or the diffracted wave received by the receiver.

2. The system according to claim 1, wherein the determining of whether or not there is an abnormality in the blades through the analysis processing includes distinguishing blades where an abnormality has occurred from blades where no abnormality has occurred, on the basis of a state of variations in reception level of the reflected wave or the diffracted wave received by the receiver.

3. The system according to claim 1, wherein the determining of whether or not there is an abnormality in the blades through the analysis processing includes distinguishing blades where an abnormality has occurred from blades where no abnormality has occurred, on the basis of a state of variations in phase difference of the reflected wave or the diffracted wave received by the receiver with respect to a direct wave.

4. A method for checking blades of a wind power plant, the method comprising:

causing a first unmanned aerial vehicle with a transmitter of electromagnetic waves mounted thereon to wait in surroundings of rotating surfaces of the blades;

causing a second unmanned aerial vehicle with a receiver of electromagnetic waves mounted thereon to wait in the surroundings of the rotating surfaces;

emitting electromagnetic waves from the transmitter toward the rotating surfaces in a state where the first unmanned aerial vehicle and the second unmanned aerial vehicle face each other with the rotating surfaces sandwiched therebetween;

receiving, by the receiver, at least one of a reflected wave and a diffracted wave generated by the blades due to emission of the electromagnetic waves from the transmitter; and determining whether or not there is an abnormality in the blades through analysis processing of the reflected wave or the diffracted wave received by the receiver.

5. The method according to claim 4, wherein the determining of whether or not there is an abnormality in the blades through the analysis processing includes distinguishing blades where an abnormality has occurred from blades where no abnormality has occurred, on the basis of a state of variations in reception level of the reflected wave or the diffracted wave received by the receiver.

6. The method according to claim 4, wherein the determining of whether or not there is an abnormality in the blades through the analysis processing includes distinguishing blades where an abnormality has occurred from blades where no abnormality has occurred, on the basis of a state of variations in phase difference of the reflected wave or the diffracted wave received by the receiver with respect to a direct wave.

7. A device for checking blades of a wind power plant, the device comprising:

an antenna;

receiving circuitry that is configured to receive, by using the antenna, at least one of a reflected wave and a diffracted wave generated by the blades due to emission of electromagnetic waves from a transmitter of electromagnetic waves in a case where the antenna faces the transmitter with rotating surfaces of the blades sandwiched therebetween; and analysis processing circuitry that is configured to determine whether or not there is an abnormality in the blades through analysis processing of the reflected wave or the diffracted wave received by the receiving circuitry.

* * * * *